US008335315B2

(12) United States Patent
Yoon

(10) Patent No.: US 8,335,315 B2
(45) Date of Patent: Dec. 18, 2012

(54) DECRYPTION METHOD AND APPARATUS USING EXTERNAL DEVICE OR SERVICE AND REVOCATION MECHANISM, AND DECRYPTION SUPPORT METHOD AND APPARATUS

(75) Inventor: Young-sun Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1103 days.

(21) Appl. No.: 11/500,965

(22) Filed: Aug. 9, 2006

(65) Prior Publication Data
US 2007/0121938 A1 May 31, 2007

Related U.S. Application Data
(60) Provisional application No. 60/739,438, filed on Nov. 25, 2005.

(30) Foreign Application Priority Data
Dec. 7, 2005 (KR) ........................ 10-2005-0118842

(51) Int. Cl.
H04L 29/06 (2006.01)
(52) U.S. Cl. ........... 380/44; 380/279; 713/162; 713/163
(58) Field of Classification Search .................... 380/44, 380/239, 279–282; 713/162, 163; 725/31
See application file for complete search history.

(56) References Cited

U.S. PATENT DOCUMENTS

| 6,880,081 | B1 * | 4/2005 | Itkis ............................. 713/163 |
| 7,272,229 | B2 | 9/2007 | Nakano et al. | |
| 2002/0133701 | A1 | 9/2002 | Lotspiech et al. | |
| 2002/0147906 | A1 | 10/2002 | Lotspiech et al. | |
| 2003/0105956 | A1 * | 6/2003 | Ishiguro et al. ............... 713/158 |
| 2003/0182565 | A1 * | 9/2003 | Nakano et al. ................ 713/193 |
| 2004/0052377 | A1 * | 3/2004 | Mattox et al. ................. 380/277 |
| 2005/0141706 | A1 | 6/2005 | Regli et al. | |
| 2005/0144468 | A1 * | 6/2005 | Northcutt et al. ............. 713/189 |
| 2005/0157878 | A1 * | 7/2005 | Matsushita ................... 380/239 |
| 2006/0002565 | A1 * | 1/2006 | Takemura ..................... 380/286 |

(Continued)

FOREIGN PATENT DOCUMENTS
JP 2002152187 A 5/2002
(Continued)

OTHER PUBLICATIONS

Boneh, Dan et al.: "A Method for Fast Revocation of Public Key Certificates and Security Capabilities", 10th USENIX Security Symposium, Aug. 2001.

(Continued)

Primary Examiner — Justin T Darrow
(74) Attorney, Agent, or Firm — Sughrue Mion, PLLC

(57) ABSTRACT

A method of protecting digital contents includes: requesting an external device or service to perform a part of a process of decrypting encrypted contents which correspond to a leaf node among a plurality of leaf nodes in a tree used in a revocation mechanism according to whether the leaf node has been revoked; and decrypting the encrypted contents based on a response to the request. Therefore, even when the data storage capacity of a device is small or the data processing capability thereof is low, the contents encrypted according to a broadcast encryption scheme can be decrypted.

16 Claims, 10 Drawing Sheets

U.S. PATENT DOCUMENTS

2007/0079118 A1    4/2007    Chmora et al.

FOREIGN PATENT DOCUMENTS

| | | |
|---|---|---|
| JP | 2003204320 A | 7/2003 |
| KR | 1020060052536 A | 5/2006 |
| KR | 1020060057670 A | 5/2006 |

OTHER PUBLICATIONS

Dan, Boneh, et al.: "A method for Fast Revocation of Public Key Certificates and Security Capabilities", In $10^{th}$ USENIX Security Symposium, Aug. 2001, pp. 1-12.

Japanese Office Action, dated Aug. 17, 2010, issued in Japanese application No. 2007-269166.

Communication dated Jul. 12, 2011 issued by Japanese Patent Office issued in counterpart Japanese Application No. 2006-317699.

Communication dated Aug. 10, 2011 issued by the European Patent Office in counterpart European Application No. 06823672.8.

Ju, Haksoo et al. "Modified ID-Based Threshold Decryption and Its Application to Mediated ID-Based Encryption." Jan. 1, 2005. Frontiers of WWW Research and Development—APWEB 2006 Lecture Notes in Computer Science; LNCS. Springer, Berlin, DE. pp. 720-725.

Communication dated Jan. 24, 2012 issued by the Japanese Patent Office in counterpart Japanese Patent Application No. 2006-317699.

Communication dated Dec. 26, 2007 issued by the Korean Intellectual Property Office in counterpart Korean Patent Application No. 10-2005-0118842.

Communication dated Jun. 12, 2012 issued by the Japanese Patent Office in counterpart Japanese Application No. 2006-317699.

Communication dated Aug. 31, 2012 issued by the State Intellectual Property Office of P.R. China in counterpart Chinese Application No. 200680040826.4.

\* cited by examiner

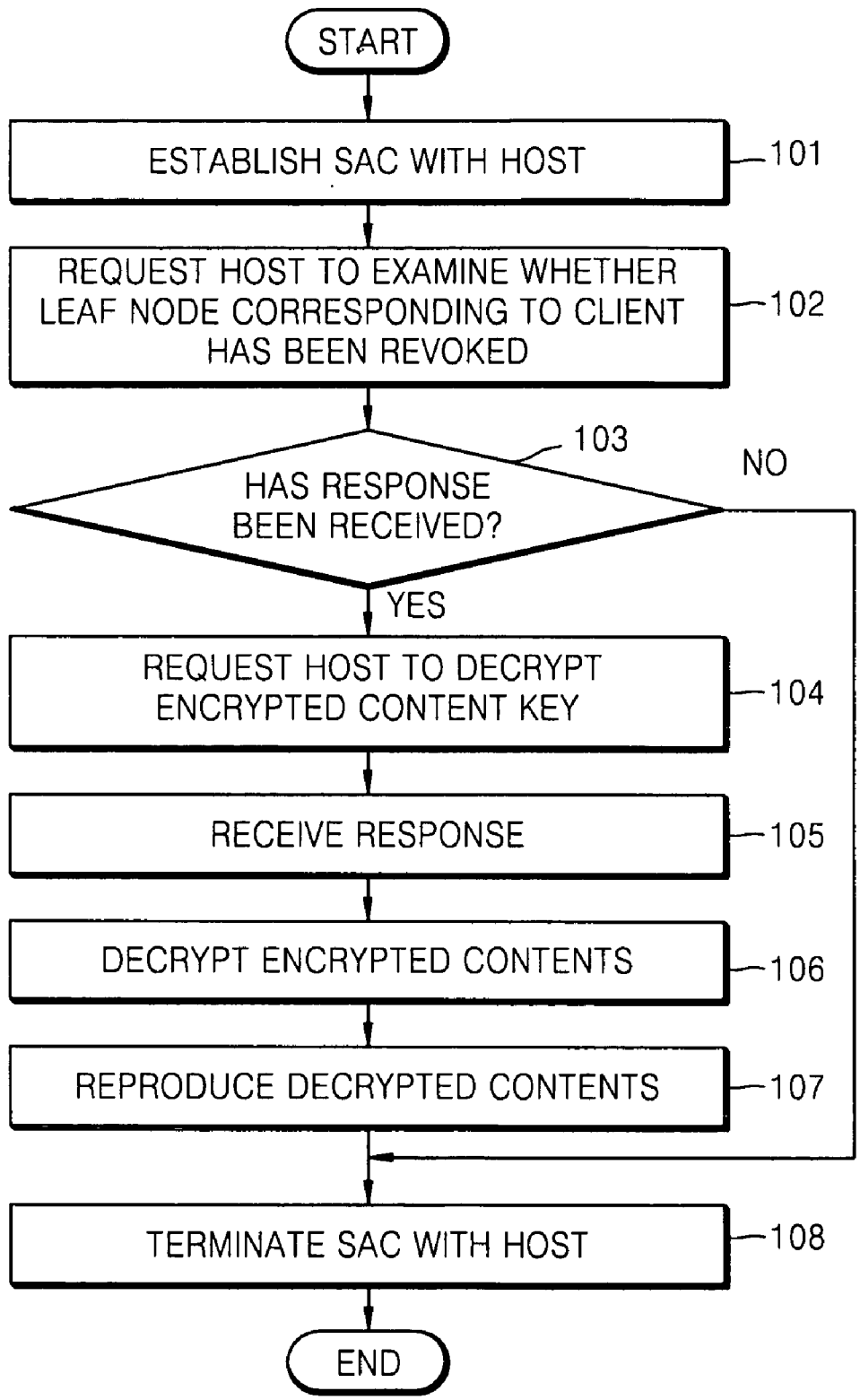

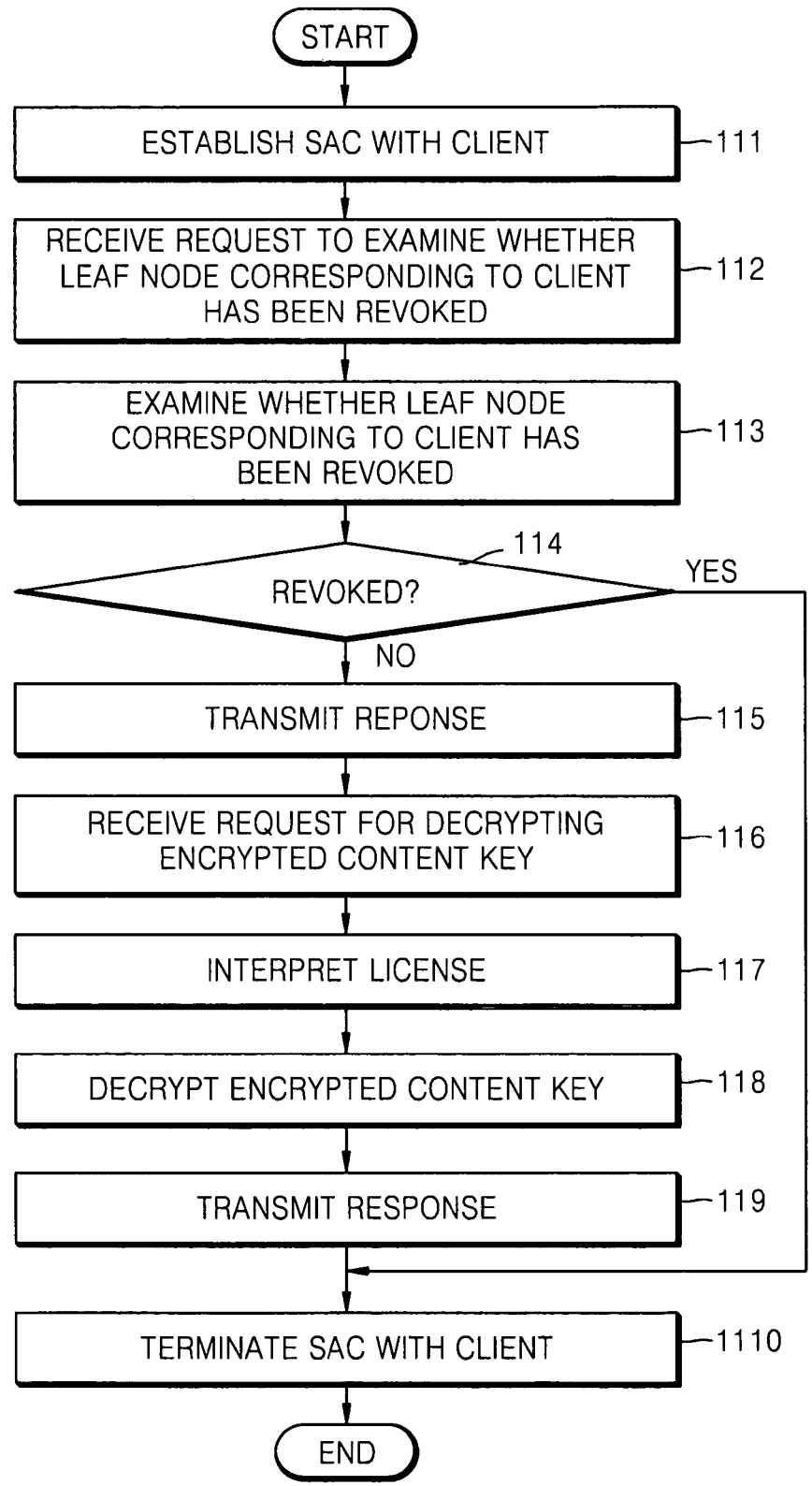

US 8,335,315 B2

DECRYPTION METHOD AND APPARATUS USING EXTERNAL DEVICE OR SERVICE AND REVOCATION MECHANISM, AND DECRYPTION SUPPORT METHOD AND APPARATUS

This application claims priority from Korean Patent Application No. 10-2005-0118842, filed on Dec. 7, 2005, in the Korean Intellectual Property Office, and U.S. Provisional Patent Application No. 60/739,438, filed on Nov. 25, 2005, in the U.S. Patent and Trademark Office, the disclosures of which are incorporated herein in their entirety by reference.

BACKGROUND OF THE INVENTION

1. Field of the Invention

Methods and apparatuses consistent with the present invention relate to protecting digital contents, and more particularly, to decrypting contents using a revocation mechanism, and decryption support.

2. Description of the Related Art

Recently, a rapidly increasing amount of digital content has been transmitted using various communications mediums such as the Internet, terrestrial networks, cable networks, and satellites. In addition, the sale and rental of digital contents using large-capacity recording mediums such as compact disks (CDs) and digital versatile disks (DVDs) have dramatically increased. Accordingly, digital rights management (DRM), a method of protecting copyrights of digital contents, is emerging as an important issue. Among DRM related technologies, a broadcast encryption scheme has been actively studied. In the broadcast encryption scheme, digital contents broadcast using a recording medium, such as a CD or a DVD, or the Internet are encrypted to protect the digital contents.

The broadcast encryption scheme generally uses a conventional revocation mechanism which encrypts contents using a content key and encrypts the content key using a revocation key for managing the revocation of, for example, a device or an application program, or encrypts a broadcast key used to encrypt the content key. Therefore, a device or an application program must have an identifier (ID) of a corresponding node and a revocation key set to decrypt the contents encrypted according to the broadcast encryption scheme. To decrypt the contents encrypted according to the broadcast encryption scheme, the device or the application program must also perform a decryption process. In other words, the device or the application program must receive a key block, examine whether the device or the application program has been revoked based on the received key block, and decrypt the encrypted content key. However, such a decryption process imposes a severe burden on the device or the application program when its data storage capacity is small or when its data processing capability is low.

SUMMARY OF THE INVENTION

The present invention provides an apparatus and method for decrypting contents encrypted according to a broadcast encryption scheme, even when the data storage capacity of a device is small or the data processing capability thereof is low.

The present invention also provides a computer-readable recording medium on which a program for executing the method is recorded.

According to an aspect of the present invention, there is provided a decryption method including: requesting an external device or service to perform a part of a decryption process of decrypting encrypted contents corresponding to a predetermined node among a plurality of nodes according to whether the predetermined node has been revoked; and decrypting the encrypted contents corresponding to the predetermined node based on a response to the request.

According to another aspect of the present invention, there is provided a computer-readable recording medium on which a program for executing the decryption method is recorded.

According to another aspect of the present invention, there is provided a decryption apparatus including: a request unit requesting an external device or service to examine whether a predetermined node among a plurality of nodes has been revoked; and a decrypting unit decrypting encrypted contents corresponding to the predetermined node based on a response to the request.

According to another aspect of the present invention, there is provided a decryption support method including: receiving a request to perform a part of a decryption process of decrypting encrypted contents corresponding to a predetermined node among a plurality of nodes according to whether the predetermined node has been revoked; performing the part of the decryption process in response to the received request; and transmitting a response including the result of performing the part of the decryption process.

According to another aspect of the present invention, there is provided a computer-readable recording medium on which a program for executing the decryption support method is recorded.

According to another aspect of the present invention, there is provided a decryption support apparatus including: a revocation examination request receiving unit receiving a request to examine whether a predetermined node among a plurality of nodes has been revoked; a revocation examination unit examining whether the predetermined node has been revoked in response to the request received by the revocation examination request receiving unit; and a revocation examination response unit transmitting a response containing the result of examination by the revocation examination unit.

BRIEF DESCRIPTION OF THE DRAWINGS

The above and other aspects of the present invention will become more apparent by describing in detail exemplary embodiments thereof with reference to the attached drawings in which:

FIG. 10 is a flowchart illustrating a decryption method according to an exemplary embodiment of the present invention; and FIG. 11 is a flowchart illustrating a decryption support method according to an exemplary embodiment of the present invention.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth therein; rather, these exemplary embodiments are provided so that this disclosure will be thorough and complete, and will fully convey the concept of the invention to those skilled in the art.

Figure 1:
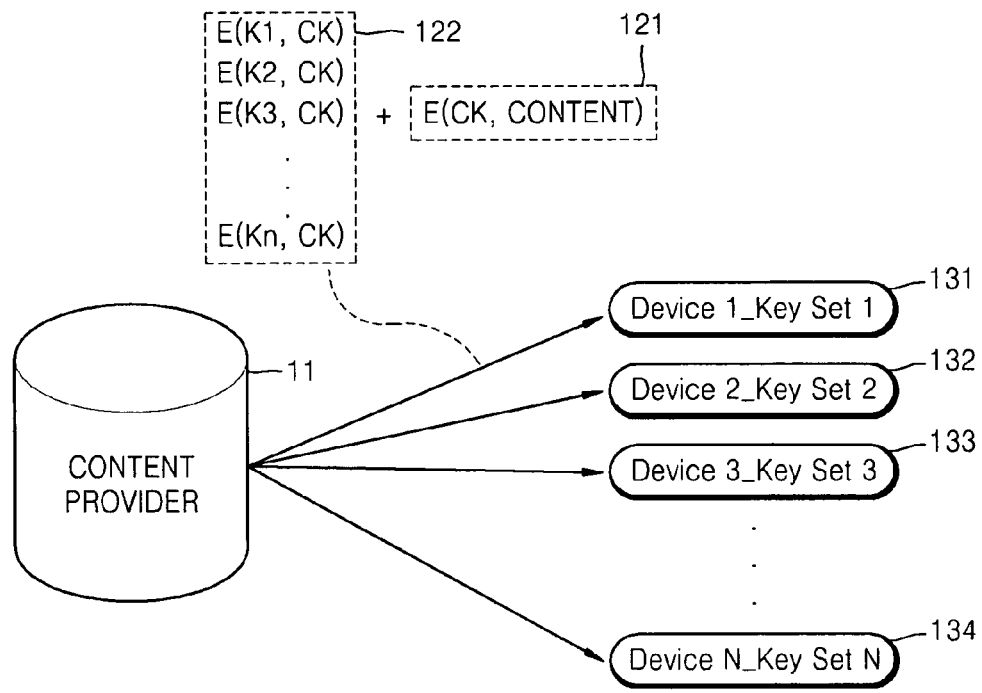
FIG. 1 illustrates a related art broadcast encryption scheme.

FIG. 1 illustrates a related art broadcast encryption scheme. Referring to FIG. 1, a content provider 11 encrypts contents using a content key CK and broadcasts the encrypted contents to devices 131 through 134 that desire to reproduce the encrypted contents. The contents encrypted using the content key CK are expressed as E (CK, Content) 121.

In addition, the content provider 11 encrypts the content key CK using keys K1 through Kn retained by the devices 131 through 134 and broadcasts the encrypted content key CK to the devices 131 through 134. In FIG. 1, the content key CK encrypted using the keys K1 through Kn of the devices 131 through 134 is illustrated as E (K1, CK) through E (Kn, CK), and the content key thus encrypted is expressed as {E (Ki, CK)} 122.

Each of the devices 131 through 134 attempts to decrypt the encrypted content key {E (Ki, CK)} 122 received from the content provider 11 using its key set. The devices 131 through 134 which have at least one key matching one of the keys used to encrypt {E (Ki, CK)} 122 can decrypt the encrypted content key {E (Ki, CK)} 122. However, the devices 131 through 134 which do not have a key matching any of the keys used to encrypt E (Ki, CK) cannot decrypt the encrypted content key {E (Ki, CK)} 122. The devices which decrypt the encrypted content key {E (Ki, CK)} 122 can also decrypt the encrypted contents E (CK, Content) 121 using the content key CK.

Therefore, the content provider 11 can encrypt the content key CK using keys that devices revoked due to exposure of a key set and so on do not have and broadcast the encrypted content key {E (Ki, CK)} 122 to the devices 131 through 134 so that the revoked devices cannot decrypt the encrypted content key {E (Ki, CK)} 122. Consequently, the devices which are revoked due to the exposure of the key set cannot decrypt the encrypted content key {E (Ki, CK)} 122.

Figure 2:
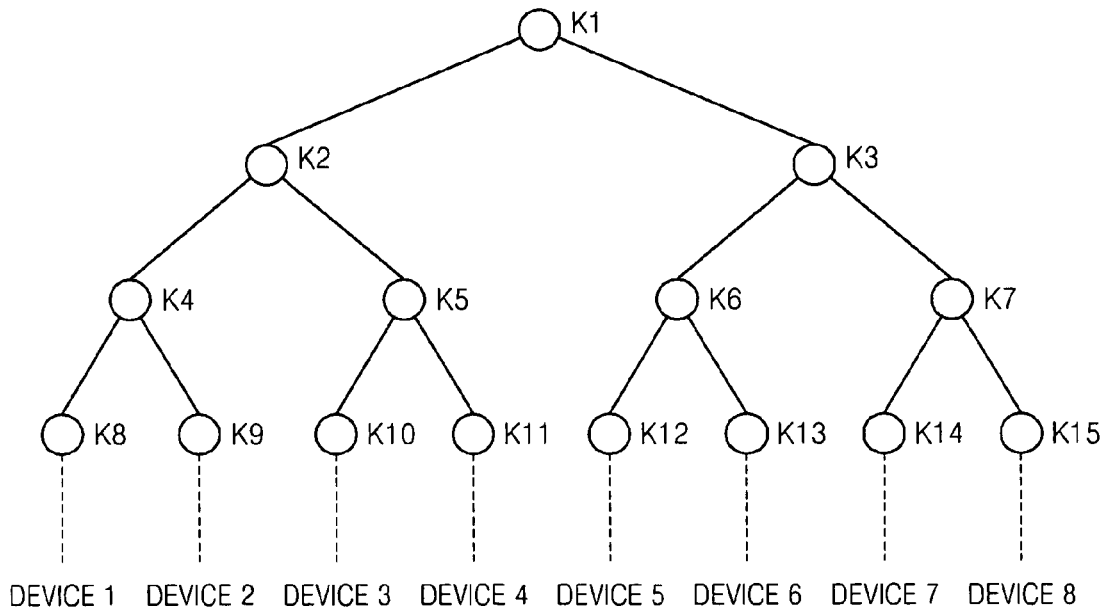
FIG. 2 illustrates an example of a tree used in the broadcast encryption scheme of FIG. 1.

FIG. 2 illustrates an example of a tree used in the broadcast encryption scheme of FIG. 1. Referring to FIG. 2, the tree used in the broadcast encryption scheme is a 4-layer, 2-ary tree in which each ancestor node has two descendent nodes, and there are four layers. A key is allocated to each node in the tree.

A node at the top of the tree is called a root node, and nodes at the bottom of the tree are called leaf nodes. According to the related art broadcast encryption scheme, devices respectively correspond to the leaf nodes, and keys of nodes located along shortest paths from the leaf nodes to the root node are allocated to the devices. Alternatively, application programs may respectively correspond to the leaf nodes. For example, keys of nodes located on the shortest paths from the a leaf node corresponding to device 1 to the root node are K1, K2, K4 and K8, and a key set composed of the keys K1, K2, K4 and K8 is allocated to device 1.

When none of the keys of any of the leaf nodes in the tree illustrated in FIG. 2 are revoked, all of the devices can decrypt all contents, which have been encrypted according to the broadcast encryption scheme, using the key K1 of the root node. Therefore, a minimum key set required for the devices to decrypt the contents E (CK, Content) encrypted according to the broadcast encryption scheme is K1.

Figure 3:
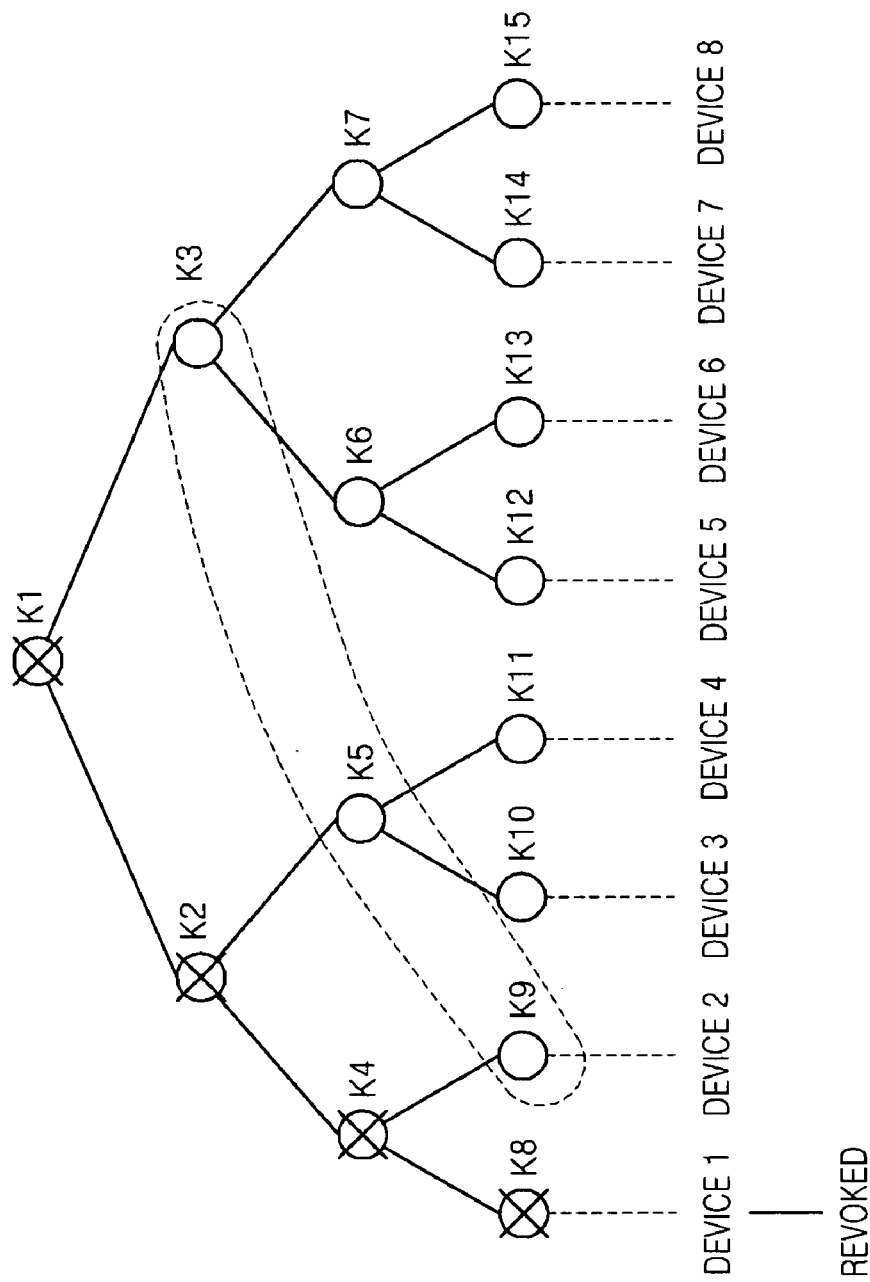
FIG. 3 illustrates a tree in which one of leaf nodes included in the tree of FIG. 2 is revoked.

FIG. 3 illustrates a tree in which one of the leaf nodes included in the tree of FIG. 2 is revoked. Referring to FIG. 3, the keys K1, K2, K4 and K8 leading to the leaf node corresponding to device 1 are revoked. In this case, all devices except for device 1 can decrypt all contents encrypted according to the broadcast encryption scheme using the keys K3, K5 and K9. Therefore, a minimum key set required for all of the devices excluding device 1 to decrypt the contents E (CK, Content) encrypted according to the broadcast encryption scheme, that is, a minimum key set shared by all of the devices excluding device 1, includes the keys K3, K5, and K9.

When the number of devices to which the broadcast encryption scheme is applied is increased, the number of revoked keys that must be respectively allocated to the devices increases exponentially. To solve such a problem, a hierarchical hash-chain broadcast encryption scheme (HBES), which is a modified version of the broadcast encryption scheme, has been proposed.

Figure 4:
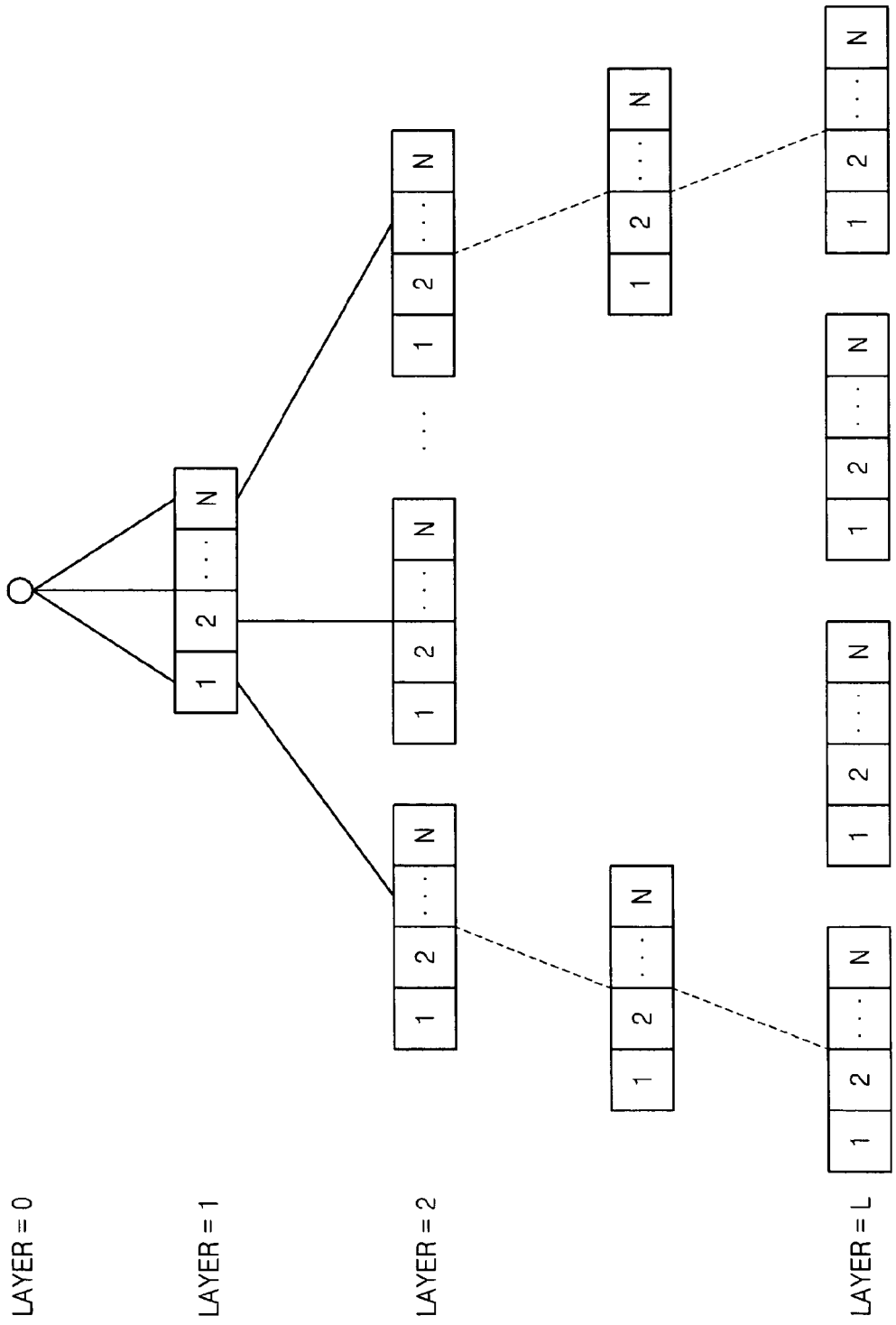
FIG. 4 illustrates a related art hierarchical hash-chain broadcast encryption scheme (HBES) key tree.

FIG. 4 illustrates a related art HBES key tree. Referring to FIG. 4, the related art HBES key tree is an L-layer, N-ary tree in which groups of nodes are arranged in a hierarchical manner. HBES node key sets, which are a type of revocation keys, are allocated to the groups of nodes. In addition, leaf nodes included in the groups of nodes in the HBES key tree respectively correspond to devices, and HBES leaf node key sets are respectively allocated to the devices.

An HBES node key set includes a seed value and values obtained after seed values different from the seed value are hashed with different frequencies. More specifically, a first seed value and values obtained after the first seed value is successively hashed are allocated to each of the nodes included in one of the groups of nodes in the HBES key tree, and a second seed value and values obtained after the second seed value is successively hashed are shifted by one node and are allocated to each of the nodes included in one of the groups of nodes. This process is repeated until a last seed value and values obtained after the last seed value is successively hashed are allocated.

Figure 5:
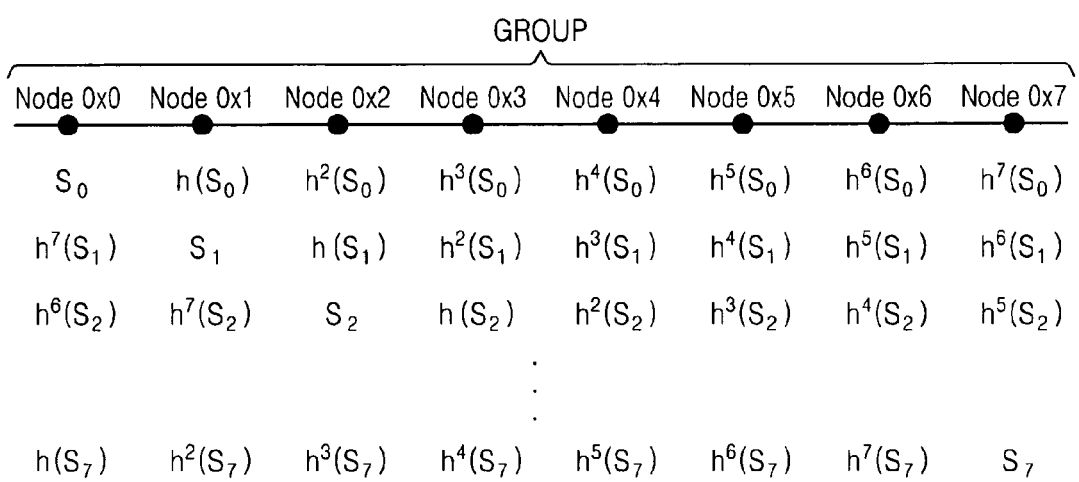
FIG. 5 illustrates a related art HBES node key set.

FIG. 5 illustrates a related art HBES node key set. Referring to FIG. 5, the HBES node key set for a group including eight nodes is illustrated. In the HBES node key set illustrated in FIG. 5, a function h denotes a hash function, and hj(Si) denotes a value obtained after Si is hashed j times. For example, S0, a value obtained after S1 is hashed seven times, a value obtained after S2 is hashed six times, . . . , and a value obtained after S7 is hashed once are allocated to a first node 0x0.

As in the related art broadcast encryption scheme, in the HBES, devices respectively correspond to leaf nodes in the HBES node key tree (hereinafter referred to as HBES leaf nodes), and keys of nodes located on shortest paths from the leaf nodes to a root node are allocated to the devices. Alternatively, application programs may respectively correspond to the leaf nodes. Therefore, according to the HBES, although the number of revocation keys is reduced, the amount of data of the HBES leaf node key set is increased.

Figure 6:
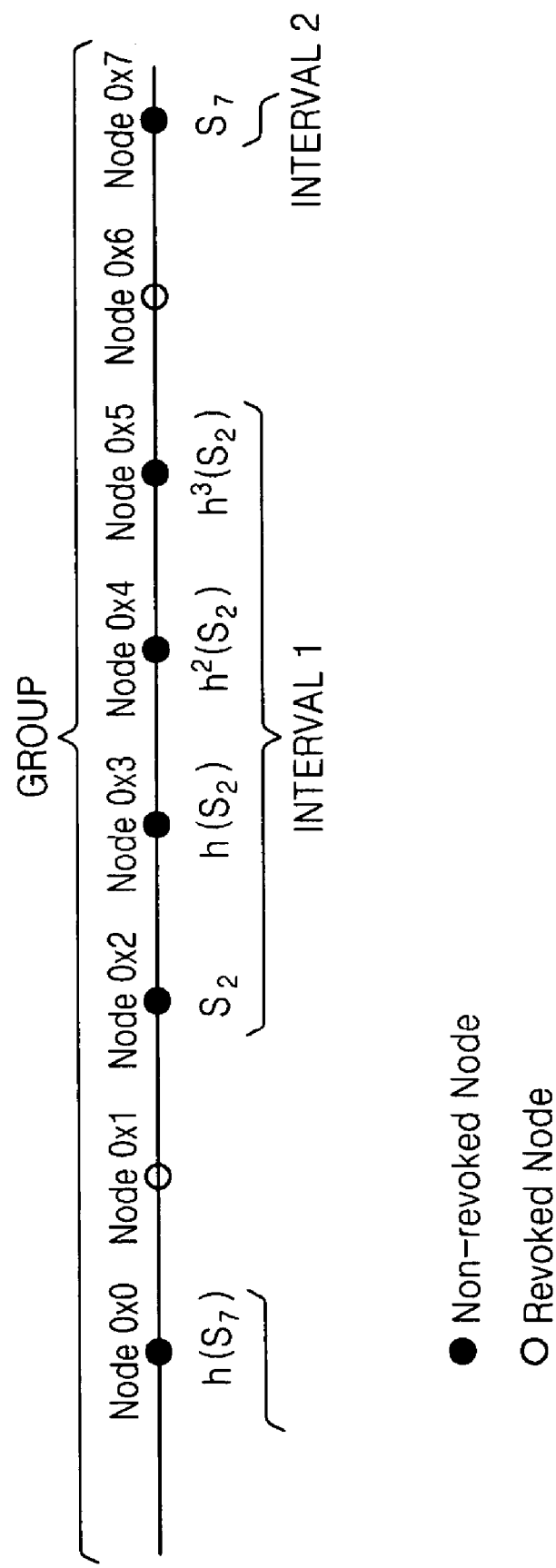
FIG. 6 illustrates HBES leaf nodes of FIG. 5, some of which are revoked.

FIG. 6 illustrates the HBES leaf nodes of FIG. 5 after some of the HBES leaf nodes have been revoked. Referring to FIG. 6, a second node 0x1 and a seventh node 0x6 among the HBES leaf nodes have been revoked. According to the HBES, a broadcast key block which includes information indicating which leaf nodes have been revoked is frequently broadcast to the devices respectively corresponding to the HBES leaf nodes. In so doing, the devices can recognize which of the HBES leaf nodes have been revoked.

Generally, a broadcast key block includes a length, a structure version and a revocation version of the broadcast key block, a key check data, the number of reserved leaf nodes, the number of revoked leaf nodes, and information regarding revoked nodes. In particular, the information regarding revoked nodes illustrated in FIG. 6 includes {0000012, 0001102, signature, E (H3(S2), BK), E (H(S7), BK)}. In this case, a broadcast key BK may be the content key CK used to encrypt contents or a key encryption key KEK used to encrypt the content key CK.

Figure 7:
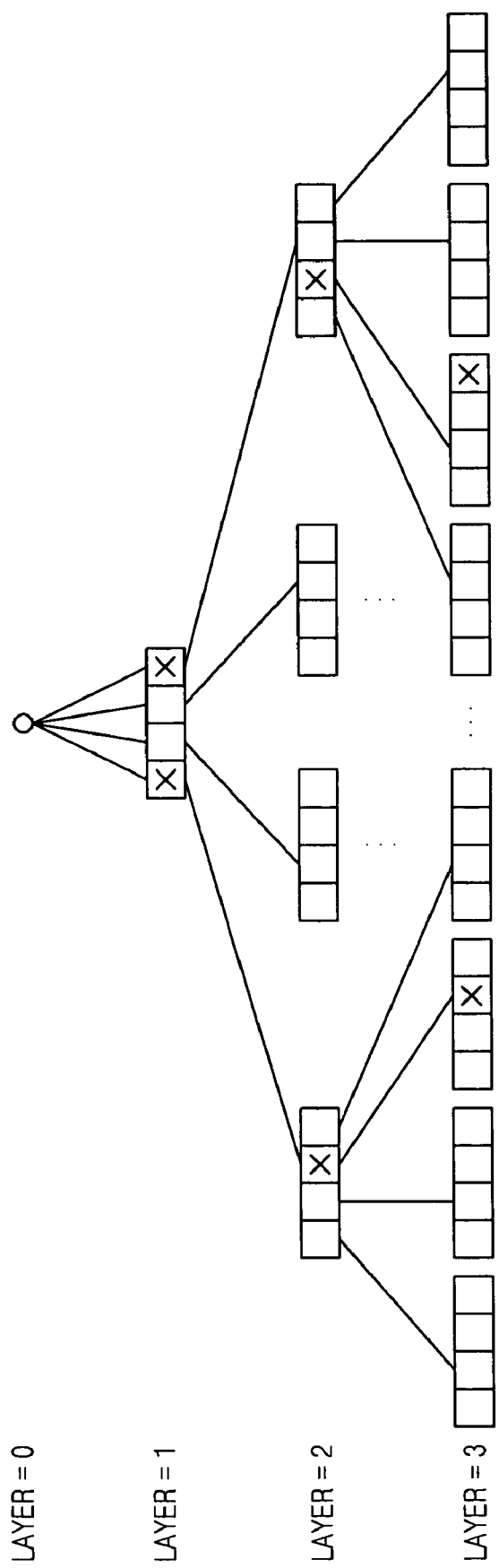
FIG. 7 illustrates another related art HBES key tree.

FIG. 7 illustrates another related art HBES key tree. Referring to FIG. 7, the HBES key tree is a 3-layer, 4-ary tree. Of nodes included in groups in the HBES key tree, those indicated by X are those with revoked HBES leaf node key sets. A large number of bits are required to express such information regarding revoked nodes in the HBES key tree illustrated in FIG. 2.

As described above, each device or application program has an ID of a corresponding node and an HBES leaf node key set. To decrypt the encrypted contents according to the HBES, the device or the application program performs a decryption process. In other words, the device or the application program receives a broadcast key block, determines whether the device or the application program has been revoked based on the received broadcast key block, and decrypts the encrypted content key if possible. However, such a decryption process imposes a severe burden on the device or the application program when its data storage capacity is small or when its data processing capability is low.

Figure 8:
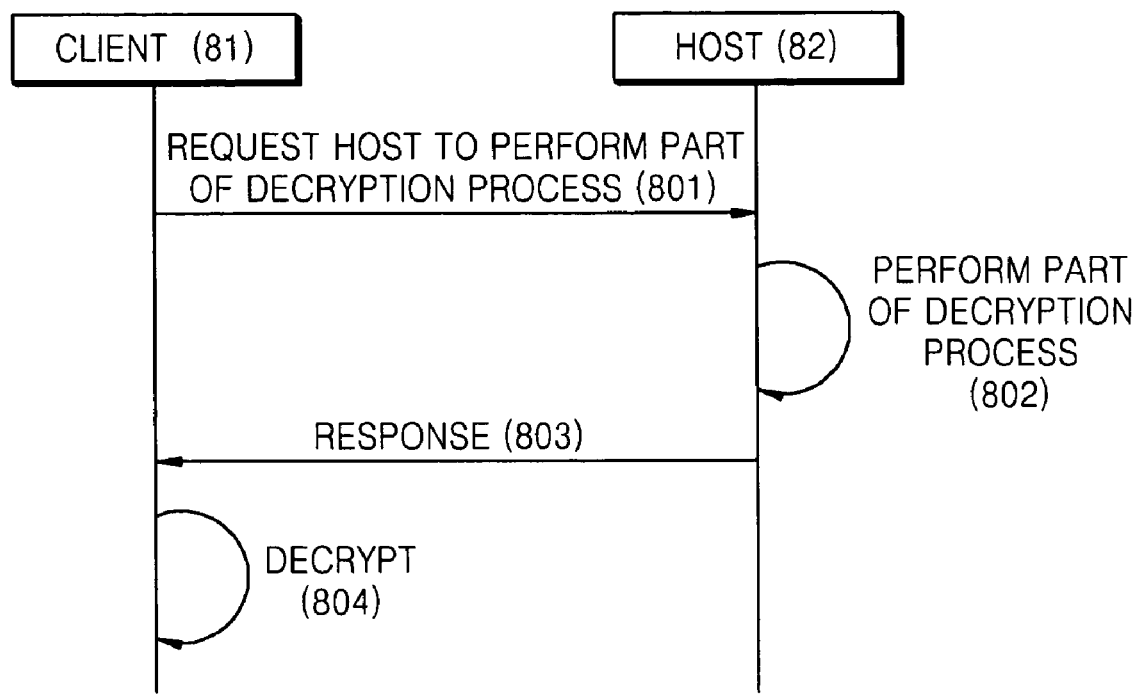
FIG. 8 is a schematic flowchart illustrating a decryption method and a decryption support method according to an exemplary embodiment of the present invention.

FIG. 8 is a schematic flowchart illustrating a decryption method and a decryption support method according to an exemplary embodiment of the present invention. Referring to FIG. 8, the decryption method is performed by a client 81, and the decryption support method is performed by a host 82. The host 82 need not necessarily be a physical device. Instead, the host 82 may be a service provided by a device.

When the data storage capacity of the client 81 is small or the data processing capability thereof is low, the client 81 requests the host 82 to perform a part of the decryption process according to whether an HBES leaf node corresponding to the client 81 has been revoked in operation 801. Accordingly, the host 81 receives the request in operation 801.

For example, the client 81 may request the host 82 to examine whether the HBES leaf node corresponding to the client 81 has been revoked and to decrypt the encrypted content key accordingly.

When the data storage capacity of the client 81 is small, the client 81 may retain only part of the information required to perform the decryption process. In this case, the client 81 may request the remaining information by sending to the external host 82 that retains the remaining information a message including the part of the information.

When the data storage capacity of the client 81 is sufficient but the data processing capability thereof is low, the client 81 may retain all of the information required to perform the decryption process. In this case, the client 81 sends the external host 82 a message including a part or all of the information.

In operation 802, the host 82 performs the part of the decryption process requested by the client 81 in response to the request message. For example, the host 82 may examine whether the HBES leaf node corresponding to the client 81 has been revoked and decrypt the encrypted content key on behalf of the client 81 accordingly.

In operation 803, the host 82 sends to the client 81 a response including the processing results obtained in operation 802. Accordingly, the client 81 receives the response to the request message transmitted in operation 801.

In operation 804, the host 82 decrypts encrypted contents corresponding to the client 81 based on the response received in operation 803. For example, the host 82 decrypts the encrypted contents using a content key which is included in the response received in operation 803.

Figure 9:
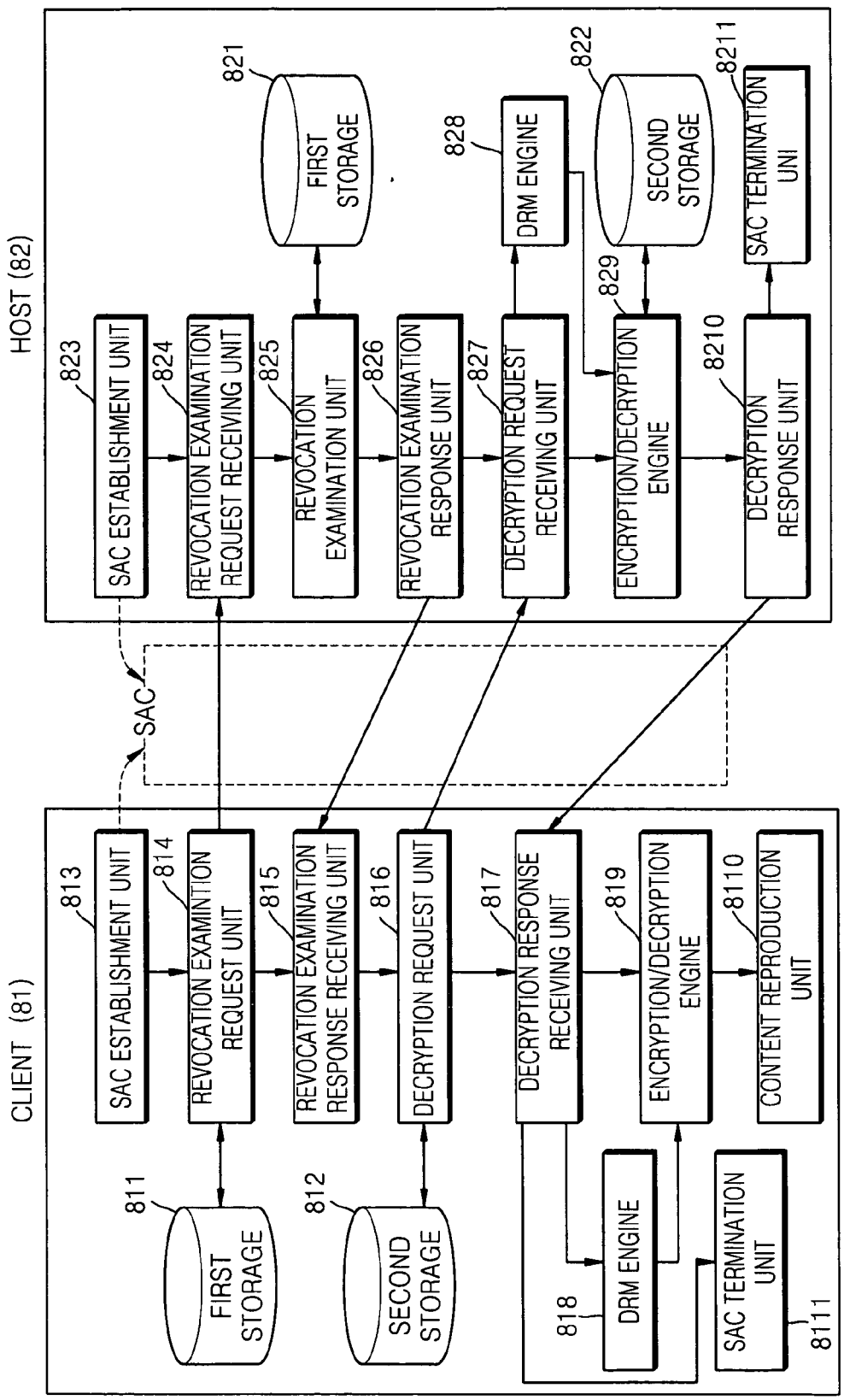
FIG. 9 is a block diagram of a client and a host according to an exemplary embodiment of the present invention.

FIG. 9 is a block diagram of a client 81 and a host 82 according to an exemplary embodiment of the present invention. Referring to FIG. 9, a decryption apparatus of the client 81 includes a first storage 811, a second storage 812, a secured authenticated channel (SAC) establishment unit 813, a revocation examination request unit 814, a revocation examination response receiving unit 815, a decryption request unit 816, a decryption response receiving unit 817, a DRM engine 818, an encryption/decryption engine 819, a content reproduction unit 8110, and an SAC termination unit 8111.

While the present exemplary embodiment is applied to the HBES, it will be understood by those of ordinary skill in the art that the present exemplary embodiment may be applied to the related art broadcast encryption scheme illustrated in FIG. 2. In addition, in the present exemplary embodiment, devices respectively correspond to HBES leaf nodes. However, it will be understood by those of ordinary skill in the art that application programs may respectively correspond to the HBES leaf nodes.

The present exemplary embodiment uses a method of encrypting contents using a content key CK, encrypting the content key CK using a broadcast key BK, and encrypting the broadcast key CK using a minimum key set shared by all nodes excluding revoked nodes. However, it will be understood by those of ordinary skill in the art that the present exemplary embodiment may also use a method of encrypting contents using the content key CK and encrypting the content key CK using the minimum key set shared by all of the nodes excluding the revoked nodes.

The first storage 811 stores a license and encrypted contents E (CK, content) according to a DRM standard applied to the present exemplary embodiment. Generally, a license includes information that can remove a means of protecting contents and information regarding the allowed scope of content usage. In particular, the license according to the present exemplary embodiment includes an encrypted content key E (BK, CK) as the information that can remove the means of protecting contents. According to another methods of implementing the present exemplary embodiment, the first storage 811 may store a part or all of a broadcast key block in addition to the license and the encrypted contents E (CK, content). The broadcast key block includes information regarding revoked leaf nodes, the information indicating which HBES leaf nodes have been revoked, and an encrypted broadcast key {E (hj (Si), BK)}.

The second storage 812 stores a unique key of the client 81 and an ID of the leaf node corresponding to the client 81 among the leaf nodes included in the HBES key tree of FIG. 5. However, according to another method of implementing the present exemplary embodiment, the second storage 812 may store an HBES leaf node key set in addition to the unique key of the client 81 and the ID of the leaf node corresponding to the client 81. Since such information stored in the second storage 812 must not be exposed, access to the second storage 812 must be blocked.

The SAC establishment unit 813 establishes an SAC with the host 82. More specifically, the SAC establishment unit 813 and the host 82 authenticate each other. When each of the client 81 and the host 82 has a part or all of a broadcast key block, the SAC establishment unit 813 and the host 82 can authenticate each other using the part of or the entire broadcast key block. When the SAC establishment unit 813 and the host 82 successfully authenticate each other, the SAC establishment unit 813 produces a random number and exchanges the random number with the host 82. Then, the SAC establishment unit 813 generates a session key based on a random number of the client 81 and the random number of the host 82 and establishes an SAC for a session using the session key. The client 81 and the host 82 can safely exchange messages with each other through the SAC established by the SAC establishment unit 813. In other words, the client 81 encrypts a message using the session key and transmits the encrypted message to the host 82, and the host 82 receives the encrypted message from the client 82 and decrypts the encrypted message. According to another method of implementing the present exemplary embodiment, the SAC establishment unit 813 need not be established.

The revocation examination request unit 814 requests the host 82 to examine whether the leaf node corresponding to the client 81 has been revoked. More specifically, the revocation examination request unit 814 transmits a revocation examination request message including the ID of the HBES leaf node corresponding to the client 81, which is part of the information required to examine whether the HBES leaf node corresponding to the client 81 has been revoked, to the host 82, which retains the broadcast key block and the HBES leaf node key set.

It is possible for the client 81 to retain the HBES leaf node key set but be unable to decrypt the encrypted content key E (BK, CK). In this case, the revocation examination request unit 814 may transmit the revocation examination request message including the HBES leaf node key set in addition to the ID of the leaf node corresponding to the client 81 to the host 82, which retains the broadcast key block. It is also possible for the client 81 to retain a part of the broadcast key block. In this case, the revocation examination request unit 814 transmits the revocation examination request message including the part of the broadcast key block in addition to the ID of the leaf node corresponding to the client 81 to the host 82, which retains the remaining part of the broadcast key block and the HBES leaf node key set. It is also possible for the client 81 to retain the entire broadcast key block. In this case, the revocation examination request unit 814 transmits the revocation examination request message including the entire broadcast key block in addition to the HBES leaf node corresponding to the client 81 to the host 82, which retains the HBES leaf node key set.

For security, the revocation examination request unit 814 transmits the revocation examination request message though the SAC established by the SAC establishment unit 813. The revocation examination request unit 814 may encrypt the revocation examination request message using the unique key of the client 81 instead of the session key generated by the SAC establishment unit 813. When an encryption scheme used between the client 81 and the host 82 is a secret key scheme, the unique key of the client 81 is a secret key. When the encryption scheme is an open key scheme, the unique key of the client 81 is an open key.

The revocation examination response receiving unit 815 receives a response to the revocation examination request message transmitted from the revocation examination request unit 814. More specifically, the revocation examination response receiving unit 815 receives a revocation examination response message which is a response to the revocation examination request message transmitted from the revocation examination request unit 815. When the revocation examination response receiving unit 815 receives the revocation examination response message, the revocation examination result of the host 82 indicates that the leaf node corresponding to the client 81 has not been revoked. In particular, the revocation examination response receiving unit 815 receives the revocation examination response message through the SAC established by the SAC establishment unit 813. The revocation examination response receiving unit 815 may decrypt the revocation examination response message encrypted by the host 82 using the unique key of the client 81 instead of the session key generated by the SAC establishment unit 813.

When the response to the revocation examination request message transmitted from the revocation examination request unit 814 is received, the decryption request unit 816 requests the host 82 to decrypt the encrypted content key E (BK, CK). More specifically, when the revocation examination response receiving unit 815 receives the revocation examination response message, the decryption request unit 816 transmits a decryption request message including the license stored in the first storage 811. As described above, the license stored in the first storage 811 includes the encrypted content key E (BK, CK). The decryption request message may include the HBES leaf node key set stored in the second storage 812.

For security, the decryption request unit 816 transmits the decryption request message through the SAC established by the SAC establishment unit 813. The decryption request unit 816 may encrypt the decryption request message using the unique key of the client 81 instead of the session key generated by the SAC establishment unit 813.

The decryption response receiving unit 817 receives a response to the decryption request message transmitted from the decryption request unit 816. The decryption response message is a response to the decryption request message transmitted from the decryption request unit 816. In particular, the decryption response receiving unit 817 receives the decryption response message through the SAC established by the SAC establishment unit 813. The decryption response receiving unit 817 may decrypt the decryption response message encrypted by the host 82 using the unique key of the client 81 instead of the session key generated by the SAC establishment unit 813.

The DRM engine 818 interprets the license stored in the first storage 811. The decryption of the encryption/decryption engine 819 is controlled according to the interpretation of the license by the DRM engine 818. For example, the encryption/decryption engine 819 can decrypt contents within the scope of allowed content usage indicated by the interpretation of the license by the DRM engine 818. According to another method of implementing the present exemplary embodiment, the DRM engine 818 may not be used.

The encryption/decryption engine 819 decrypts the encrypted contents E (CK, Content) stored in the first storage 811 based on the response to the revocation examination request message transmitted by the revocation examination request unit 814. In other words, the encryption/decryption engine 819 decrypts the encrypted content E (CK, Content) stored in the first storage 811 using the content key CK included in the response to the decryption request message transmitted from the decryption request unit 816. More specifically, the encryption/decryption engine 819 decrypts the encrypted content E (CK, Content) stored in the first storage 811 using the content key CK included in the decryption response message received by the decryption response receiving unit 817 according to the interpretation of the license by the DRM engine 818. The encryption/decryption engine 819 may decrypt the encrypted content E (CK, Content) stored in the first storage 811 using the content key CK included in the decryption response message received by the decryption response receiving unit 817 according to the interpretation of the license included in the decryption response message received by the decryption response receiving unit 817 instead of the interpretation of the license by the DRM engine 818.

The content reproduction unit 8110 reproduces contents restored after the decryption operation is performed by the encryption/decryption engine 819.

When the decryption response receiving unit 817 receives the decryption response message, the SAC termination unit 8111 terminates the SAC established by the SAC establishment unit 813.

Referring to FIG. 9, a decryption support apparatus of the host 82 according to the present exemplary embodiment includes a first storage 821, a second storage 822, an SAC establishment unit 823, a revocation examination request receiving unit 824, a revocation examination unit 825, a revocation examination response unit 826, a decryption request receiving unit 827, a DRM engine 828, an encryption/decryption engine 829, a decryption response unit 8210, and an SAC termination unit 8211.

The first storage 821 stores a broadcast key block. According to another method of implementing the present exemplary embodiment, the first storage 821 may store a part of the broadcast key block or may not store the broadcast key block.

The second storage 822 stores a unique key of the host 82 and an HBES leaf node key set. Since such information stored in the second storage 822 must not be exposed, access to the second storage 822 must be blocked.

The SAC establishment unit 823 establishes an SAC with the client 81. More specifically, the SAC establishment unit 823 and the client 81 authenticate each other. When each of the client 81 and the host 82 has a part of or the entire broadcast key block, the SAC establishment unit 823 and the client 81 can authenticate each other using the part of or the entire broadcast key block. When the SAC establishment unit 823 and the client 81 successfully authenticate each other, the SAC establishment unit 823 produces a random number and exchanges the random number with the client 81. Then, the SAC establishment unit 823 generates a session key based on a random number of the client 81 and the random number of the host 82 and establishes an SAC for a session using the session key. According to another method of implementing the present exemplary embodiment, the SAC establishment unit 823 may be not included.

The revocation examination request receiving unit 824 receives a request to examine whether the HBES leaf node corresponding to the client 81 has been revoked from the client 81. The revocation examination request message includes the ID of the HBES leaf node corresponding to the client 81, which is a part of the information required to examine whether the HBES leaf node corresponding to the client 81 has been revoked.

For security, the revocation examination request receiving unit 824 receives the revocation examination request message though the SAC established by the SAC establishment unit 823. The revocation examination request receiving unit 824 may decrypt the revocation examination request message encrypted by the client using the unique key of the host 82 instead of the session key generated by the SAC establishment unit 823.

The revocation examination unit 825 examines whether the HBES leaf node corresponding to the client 81 has been revoked in response to the revocation examination request message received by the revocation examination request receiving unit 824. More specifically, the revocation examination unit 825 examines whether the HBES leaf node having the ID included in the revocation examination request message received by the revocation examination request receiving unit 824 has been revoked with reference to the information regarding revoked nodes. The information regarding revoked nodes indicates which of the HBES leaf nodes have been revoked in the broadcast key block stored in the first storage 821.

The revocation examination response unit 826 transmits a response including the examination result of the revocation examination unit 825. More specifically, when the examination result of the revocation examination unit 825 indicates that the HBES leaf node corresponding to the client 81 has not been revoked, the revocation examination response unit 826 transmits the revocation examination response message in response to the revocation examination request message received by the revocation examination request receiving unit 824.

For security, the revocation examination response unit 826 transmits the revocation examination response message through the SAC established by the SAC establishment unit 823. The revocation examination response unit 826 may encrypt the revocation examination response message using the unique key of the host 82 instead of the session key generated by the SAC establishment unit 823. When the encryption scheme used between the client 81 and the host 82 is the secret key scheme, the unique key of the host 82 is a secret key. When the encryption scheme is the open key scheme, the unique key of the host 82 is an open key.

The decryption request receiving unit 827 receives a request to decrypt the encrypted content key E (BK, CK) from the client 81 in response to the revocation examination response message transmitted by the revocation examination response unit 826. More specifically, the decryption request receiving unit 827 receives the decryption request message including the license of the client 81 from the client 81. The license included in the decryption request message includes the encrypted content key E (BK, CK).

For security, the decryption request receiving unit 827 receives the decryption request message through the SAC established by the SAC establishment unit 813. The decryption request receiving unit 827 may decrypt the decryption request message encrypted by the client 81 using the unique key of the host 82 instead of the session key generated by the SAC establishment unit 823.

The DRM engine 828 interprets the license. When the DRM engine 818 of the client 81 is not used, the DRM engine 828 interprets the license on behalf of the client 81 and transmits the interpretation result to the client 81.

The encryption/decryption engine 829 decrypts the encrypted content key E (BK, CK) using the HBES leaf node key set stored in the second storage 822 in response to the decryption request message received by the decryption request receiving unit 827. The encryption/decryption engine 829 may decrypt the encrypted content key E (BK, CK) using the HBES leaf node key set included in the decryption request message instead of the HBES leaf node key set stored in the second storage 822.

More specifically, the encryption/decryption engine 829 decrypts the encrypted broadcast key {E (hj (Si), BK)} included in the broadcast key block using the HBES leaf node key set stored in the second storage 822. Then, the encryption/ decryption engine 829 decrypts the encrypted content key E (BK, CK) included in the license, which is included in the decryption request message, using the broadcast key BK. When the broadcast key BK is the content key CK, the encryption/decryption engine 829 can decrypt the encrypted content key E (BK, CK) using the HBES leaf node key set stored in the second storage 822.

The decryption response unit 8210 transmits the decryption response message including the content key CK restored after the decryption operation is performed by the encryption/decryption engine 829. The decryption response message may include the interpretation of the license by the DRM engine 828. For security, the decryption response unit 8210 transmits the decryption response message through the SAC established by the SAC establishment unit 823. The decryption response unit 8210 may encrypt the decryption response message using the unique key of the host 82 instead of the session key generated by the SAC establishment unit 823. When the encryption scheme used between the client 81 and the host 82 is the secret key scheme, the unique key of the host 82 is a secret key. When the encryption scheme is the open key scheme, the unique key of the host 82 is an open key.

When the decryption response unit 8210 transmits the decryption response message, the SAC termination unit 8211 terminates the SAC established by the SAC establishment unit 813.

FIG. 10 is a flowchart illustrating a decryption method according to an exemplary embodiment of the present invention. Referring to FIG. 10, the decryption method includes operations sequentially performed by the decryption apparatus of the client 81 illustrated in FIG. 9. Therefore, although omitted below, the description regarding the decryption apparatus of the client 81 illustrated in FIG. 9 applies to the decryption method according to the present exemplary embodiment.

In operation 101, the client 81 establishes an SAC with the host 82. In operation 102, the client 81 requests the host 82 to examine whether an HBES leaf node corresponding to the client has been revoked. More specifically, in operation 102, the client 81 transmits to the host 82 a revocation examination request message including an ID of the HBES leaf node corresponding to the client 81, which is a part of the information required to examine whether the HBES leaf node corresponding to the client 81 has been revoked.

When the client 81 receives a response to the revocation examination request message through the SAC in operation 103, operation 104 is performed. When the client 81 does not receive the response, operation 108 is performed. More specifically, when the client 81 receives a revocation examination response message, which is a response to the revocation examination request message transmitted from the client 81 to the host 82 in operation 102, operation 104 is performed. Otherwise, operation 108 is performed.

After receiving the response in operation 103, the client 81 requests the host 82 to decrypt the encrypted content key E (BK, CK) In operation 104.

The client 81 receives a response to the decryption request through the SAC in operation 105. More specifically, the host 81 receives a decryption response message, which is a response to the decryption request message transmitted from the client in operation 104.

In operation 106, the client 81 decrypts the encrypted contents E (CK, Content) stored in the first storage 811 using the content key CK included in the decryption response message according to the license interpretation result which is included in the decryption response message received in operation 105.

In operation 107, the host 81 reproduces contents restored during the decryption in operation 106. In operation 108, the client 81 terminates the SAC with the host 82.

FIG. 11 is a flowchart illustrating a decryption support method according to an exemplary embodiment of the present invention. Referring to FIG. 11, the decryption support method includes operations sequentially performed by the decryption support apparatus of the host 82 illustrated in FIG. 9. Therefore, although omitted below, the descriptions regarding the decryption support apparatus of the host 82 illustrated in FIG. 9 apply to the decryption support method according to the present exemplary embodiment.

In operation 111, the host 82 establishes an SAC with the client 81. In operation 112, the host 82 receives the request from the client 81 to examine whether the HBES leaf node corresponding to the client 81 has been revoked. The revocation examination request message includes the ID of the HBES leaf node corresponding to the client 81, which is a part of information required to examine whether the HBES leaf node corresponding to the client 81 has been revoked.

In operation 113, the host 82 examines whether the HBES leaf node corresponding to the client 81 has been revoked in response to the revocation examination request received in operation 112. More specifically, the host 82 examines whether the HBES leaf node having the ID included in the revocation examination request message received by the revocation examination request receiving unit 824 has been revoked with reference to the information regarding revoked nodes. The information regarding revoked nodes indicates which of the HBES leaf nodes in the broadcast key block stored in the first storage 821 have been revoked.

When the examination result of the host 82 in operation 114 indicates that the HBES leaf node corresponding to the client 81 has not been revoked, operation 115 is performed. Otherwise, operation 1110 is performed.

In operation 115, the host 82 transmits to the client 81 a response to the revocation examination request received through the SAC in operation 112. The revocation examination response message includes the examination results obtained in operation 113.

In operation 116, the host 82 receives the request to decrypt the encrypted content key E (BK, CK) through the SAC from the client 81. The decryption request message includes the license of the client 81.

In operation 117, the host 82 interprets the license. In operation 118, the host 82 decrypts the encrypted content key E (BK, CK) using the HBES leaf node key set stored in the second storage 822 in response to the decryption request message received in operation 116.

In operation 119, the host 82 transmits a response to the decryption request message received through the SAC in operation 116. More specifically, in operation 119, the host 82 transmits to the client 81 the decryption response message including the content key restored in the decryption operation in operation 118. The decryption response message includes the result of license interpretation performed in operation 117. In operation 1110, the host 82 terminates the SAC with the client 81.

According to the present invention, an external device or service performs a part of a process of decrypting encrypted contents which correspond to an HBES leaf node among a plurality of HBES leaf nodes according to whether the HBES leaf node has been revoked. Therefore, even when the data storage capacity of the device is small or the data processing capability thereof is low, the contents encrypted according to a broadcast encryption scheme can be decrypted.

The present invention can also be implemented as computer-readable code on a computer-readable recording medium. The computer-readable recording medium is any data storage device that can store data which can be thereafter read by a computer system. Examples of the computer-readable recording medium include magnetic storage media (e.g., read-only memory (ROM), floppy disks, hard disks, etc.), optical recording media (e.g., CD-ROMs or DVDs), and storage media such as carrier waves (e.g., data transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A decryption method comprising:
   requesting, by a device that corresponds to a predetermined node among a plurality of nodes in a node tree and has at least one key allocated to the predetermined node, an external device other than the device to perform a part of a decryption process of decrypting encrypted contents, the part of the decryption process comprising examining whether only the at least one key allocated to the predetermined node has been revoked; and
   performing, by the device, a remaining part of the decryption process, that is not performed by the external device, of decrypting the encrypted contents based on a response to the request received directly from the external device,
   wherein the device retains a part of information required to perform the part of the decryption process, the external device retains a remaining part of the information required to perform the part of the decryption process, and the requesting the external device to perform the part of the decryption process comprises transmitting a request message containing the part of the information to the external device, and
   wherein the part of the decryption process further comprises decrypting an encrypted content key that encrypts the contents, and the performing the remaining part of the decryption process of decrypting of the encrypted contents comprises receiving the response to the request including the decrypted content key and decrypting the encrypted contents using the decrypted content key.

2. The method of claim 1, wherein the device retains all information required to perform the decryption process, and the requesting the external device to perform the part of the decryption process comprises transmitting a request message containing a part or all of the information to the external device.

3. A non-transitory computer-readable recording medium on which a program for executing a decryption method is recorded, the method comprising:
   requesting, by a device that corresponds to a predetermined node among a plurality of nodes in a node tree and has at least one key allocated to the predetermined node, an external device other than the device to perform a part of a decryption process of decrypting encrypted contents, the part of the decryption process comprising examining whether only the at least one key allocated to the predetermined node has been revoked; and
   performing, by the device, a remaining part of the decryption process, that is not performed by the external device, of decrypting the encrypted contents based on a response to the request received directly from the external device,
   wherein the device retains a part of information required to perform the part of the decryption process, the external device retains a remaining part of the information required to perform the part of the decryption process, and the requesting the external device to perform the part of the decryption process comprises transmitting a request message containing the part of the information to the external device, and
   wherein the part of the decryption process further comprises decrypting an encrypted content key that encrypts the contents, and the performing the remaining part of the decryption process of decrypting of the encrypted contents comprises receiving the response to the request including the decrypted content key and decrypting the encrypted contents using the decrypted content key.

4. A decryption apparatus comprising:
   a request unit which requests an external device other than the decryption apparatus to examine whether only at least one key allocated to a predetermined node that corresponds to the decryption apparatus among a plurality of nodes in a node tree, has been revoked;
   a decrypting unit which decrypts the encrypted contents based on a response to the request received directly from the external device; and
   a decryption request unit which requests the external device to decrypt an encrypted content key that encrypts the contents when the response to the request by the request unit is received,
   wherein the decryption apparatus has the at least one key allocated to the predetermined node, and
   wherein the decrypting unit decrypts the encrypted contents using the decrypted content key included in the response to the request by the decryption request unit.

5. The apparatus of claim 4, wherein the request unit requests the external device to examine whether the predetermined node has been revoked by transmitting a request message containing a part of information required to examine whether the predetermined node has been revoked.

6. The apparatus of claim 5, wherein the part of the information comprises an identification (ID) of the predetermined node in the node tree.

7. The apparatus of claim 5, further comprising a secured authenticated channel (SAC) establishment unit which establishes an SAC with the external device,
   wherein the request unit transmits the request message through the SAC established by the SAC establishment unit.

8. The apparatus of claim 5, wherein the request unit encrypts the request message using a unique key of the external device and transmits the encrypted request message.

9. A decryption support method comprising:
   receiving, by a decryption support device, a request from a device that corresponds to a predetermined node among a plurality of nodes in a node tree and has at least one key allocated to the predetermined node to perform a part of a decryption process of decrypting encrypted contents, the part of the decryption process comprising determining whether only the at least one key allocated to the predetermined node has been revoked;
   performing, by the decryption support device, the part of the decryption process in response to the received request; and transmitting, by the decryption support device, a response including a result of performing the part of the decryption process, directly to the device, wherein the device retains a part of information required to perform the part of the decryption process, and the receiving of the request comprises receiving a request message containing the part of the information required to perform the part of the decryption process.

10. The method of claim 9, wherein the device retains all information required to perform the decryption process, and the receiving of the request comprises receiving a request message containing a part or all of the information required to perform the part of the decryption process.

11. The method of claim 9, wherein the receiving of the request comprises receiving a request to decrypt an encrypted content key that encrypts the content from the device.

12. A non-transitory computer-readable recording medium on which a program for executing a decryption support method is recorded, the method comprising:
receiving, by a decryption support device, a request from a device that corresponds to a predetermined node among a plurality of nodes in a node tree and has at least one key allocated to the predetermined node to perform a part of a decryption process of decrypting encrypted contents, the part of the decryption process comprising examining whether only the at least one key allocated to the predetermined node has been revoked;
performing, by the decryption support device, the part of the decryption process in response to the received request; and
transmitting, by the decryption support device, a response including a result of performing the part of the decryption process, directly to the device,
wherein the device retains a part of information required to perform the part of the decryption process, and the receiving of the request comprises receiving a request message containing the part of the information required to perform the part of the decryption process.

13. A decryption support apparatus comprising:
a revocation examination request receiving unit which receives a request from a decryption apparatus to examine whether only at least one key allocated to a predetermined node that corresponds to the decryption apparatus among a plurality of nodes in a node tree, has been revoked;
a revocation examination unit which examines whether the predetermined node has been revoked in response to the request received by the revocation examination request receiving unit; and
a revocation examination response unit which transmits a response containing a result of examination by the revocation examination unit, directly to the decryption apparatus,
wherein the decryption apparatus has the at least one key allocated to the predetermined node,
wherein the revocation examination request receiving unit receives a request containing a part of information required to examine whether the predetermined node has been revoked, and
wherein the part of the information comprises an identification (ID) of the predetermined node in the node tree.

14. The apparatus of claim 13, wherein the revocation examination unit examines whether the predetermined node having the ID has been revoked with reference to information indicating which nodes of the plurality of nodes have been revoked.

15. The apparatus of claim 13, further comprising:
a decryption request receiving unit which receives a request to decrypt an encrypted content key that encrypts contents in response to the response transmitted from the revocation examination response unit;
a decrypting unit which decrypts the encrypted content key using a minimum node key set required to decrypt the encrypted contents in response to the request received by the decryption request receiving unit; and
a decryption response unit which transmits a response containing the content key restored by being decrypted by the decrypting unit.

16. A decryption method comprising:
requesting, by a device that corresponds to a predetermined node among a plurality of nodes in a node tree, an external device other than the device to perform a part of a decryption process of decrypting encrypted contents, the part of the decryption process comprising decrypting at least one key; and
performing, by the device, a remaining part of the decryption process, that is not performed by the external device, of decrypting the encrypted contents based on the decrypted at least one key included in a response to the request received directly from the external device,
wherein the device retains a part of information required to perform the part of the decryption process, the external device retains a remaining part of the information required to perform the part of the decryption process, and the requesting the external device to perform the part of the decryption process comprises transmitting a request message containing the part of the information to the external device, and
wherein the part of the decryption process further comprises decrypting an encrypted content key that encrypts the contents, and the performing the remaining part of the decryption process of decrypting of the encrypted contents comprises receiving the response to the request including the decrypted content key and decrypting the encrypted contents using the decrypted content key.

* * * * *